US012557720B2

(12) United States Patent
Shaw

(10) Patent No.: US 12,557,720 B2
(45) Date of Patent: Feb. 24, 2026

(54) HITCH FOR AN AGRICULTURAL VEHICLE

(71) Applicant: AGCO Corporation, Duluth, GA (US)

(72) Inventor: Matthew Benjamin Shaw, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 376 days.

(21) Appl. No.: 18/354,788

(22) Filed: Jul. 19, 2023

(65) Prior Publication Data

US 2024/0057496 A1      Feb. 22, 2024

Related U.S. Application Data

(60) Provisional application No. 63/371,675, filed on Aug. 17, 2022.

(51) Int. Cl.
A01B 59/06          (2006.01)

(52) U.S. Cl.
CPC ................................... A01B 59/066 (2013.01)

(58) Field of Classification Search
CPC ...................................................... A01B 59/066
See application file for complete search history.

(56) References Cited

U.S. PATENT DOCUMENTS

| | | | | | |
|---|---|---|---|---|---|
| 3,195,651 | A | * | 7/1965 | Todd | A01B 59/062 |
| | | | | | 172/272 |
| 3,231,294 | A | * | 1/1966 | Horney | A01B 59/062 |
| | | | | | 172/272 |
| 3,427,046 | A | * | 2/1969 | Muncke | A01B 59/062 |
| | | | | | 172/272 |
| 3,829,128 | A | * | 8/1974 | Sutton | A01B 59/062 |
| | | | | | 172/272 |
| 5,582,255 | A | * | 12/1996 | Nikkel | A01B 63/102 |
| | | | | | 172/26 |
| 7,461,702 | B2 | * | 12/2008 | Farnsworth | A01B 59/066 |
| | | | | | 172/446 |
| 10,462,954 | B2 | | 11/2019 | Quoniam et al. | |
| 2005/0012305 | A1 | | 1/2005 | Wood, Jr. et al. | |

(Continued)

FOREIGN PATENT DOCUMENTS

| | | |
|---|---|---|
| GB | 2479890 A | 11/2011 |
| WO | 2017149379 A1 | 9/2017 |

OTHER PUBLICATIONS

UK Intellectual Property Office, Search report for related UK Application No. GB2212720.3, dated Feb. 23, 2023, 3 pages.

*Primary Examiner* — Matthew R Buck

(57)          ABSTRACT

A quick hitch for an agricultural vehicle has a frame with an elongate top link member and a pair of leg members removably attached to the top link member. The top link member has a central portion extending generally horizontally in a lateral direction and a pair of side regions which extend laterally outwardly and downwardly from the central portion. Each leg member is removably attached to a distal end of a respective one of the side regions via a generally horizontally aligned joint. Each leg member may be secured to the top link member by fasteners which extend vertically, and which may be inserted and removed from above. The leg members may be attachable to the top link member in a first configuration to provide a quick hitch having a first width and in a second configuration to provide a quick hitch having a second width.

11 Claims, 4 Drawing Sheets

(56) References Cited

U.S. PATENT DOCUMENTS

| | | | |
|---|---|---|---|
| 2006/0081382 A1* | 4/2006 | Tuttle ................... | A01B 59/062 |
| | | | 172/439 |
| 2017/0238455 A1* | 8/2017 | Marwitz .............. | A01B 59/043 |
| 2018/0070524 A1* | 3/2018 | Quoniam ............. | A01B 59/062 |

* cited by examiner

HITCH FOR AN AGRICULTURAL VEHICLE

CROSS-REFERENCE TO RELATED APPLICATION

This application claims the benefit of the filing date of U.S. Provisional Patent Application 63/371,675, "A Quick Hitch," filed Aug. 17, 2022, the entire disclosure of which is incorporated herein by reference.

FIELD

Embodiments of the present disclosure relate generally to a quick hitch for an agricultural vehicle.

BACKGROUND

Quick hitches are provided as an easy-to-use interface between a three-point-linkage (also referred to as a three-point hitch) of an agricultural tractor and a further tractor implement. The quick hitch allows for relatively easy coupling of the implement to the tractor, without excessive amounts of time-consuming positioning and alignment of the linkages of the tractor. Quick hitches having adjustable dimensions to enable tractor implements of various configurations and dimensions to be coupled to a tractor using the same quick hitch are known.

Quick hitches generally have a frame which can be removably coupled to a three-point linkage of a tractor. The frame includes a laterally extending top link portion and a leg portion depending downwardly from the top link portion at either side. The frame carries fittings for attachment to an implement which are often in the form of hooks. An upper fitting is located centrally on the top link portion and lower fittings are located at the lower ends of the leg portions. Quick hitch frames are known in which the leg portions are provided as separable leg members removably attachable to a top link member. This enables the leg members to be replaced, such as in the event of wear or damage to the lower fittings, without having to replace the entire frame. In some known arrangements, the leg members are arranged so that they can be swapped from one side of the top link member to the other to vary the width between the lower fittings. This enables the hitch to be used to couple implements of differing widths to a tractor. An alternative example of an adjustable quick hitch is described in U.S. Pat. No. 10,462,954, "Quick Hitch Assembly," granted Nov. 5, 2019. This quick hitch includes spacers selectively mountable between the leg members and the top link member to vary the width dimension between the lower fittings.

BRIEF SUMMARY

In some embodiments, a hitch for an agricultural vehicle (which may also be referred to herein and in the art as a "quick hitch") comprises a frame having an elongate top link member and a pair of leg members removably attached to the top link member, the top link member having a central portion extending generally horizontally in a lateral direction and a pair of side regions which extend laterally outwardly and downwardly from the central portion, each leg member being removably attached to a distal end of a respective one of the side regions via a generally horizontally aligned joint.

In use, the joints extend horizontally, and it has been found that the quick hitch frame is stronger when the joints are aligned horizontally than when aligned vertically as is the case in known quick hitch assembles. Furthermore, because the joints are aligned horizontally, bolts or other fasteners for securing the leg members are inserted vertically from above or below. This requires less clearance between the quick hitch and parts of the vehicle, such as the rear fenders, when removing or attaching the leg members than for quick hitches having vertical joints between the leg members and the top link member and where the fasteners to attach the leg members are inserted horizontally from the side.

Each joint may be aligned generally parallel to a longitudinal axis of the central portion of the top link member.

Each joint may comprise at least one pair of corresponding coupling surfaces, wherein the at least one pair of coupling surfaces includes a first coupling surface on the distal end of the side region of the top link member and a second coupling surface on an upper end of the leg member, wherein the corresponding coupling surfaces abut one another and are inclined relative to a longitudinal axis of the central portion of the top link member by an angle of no more than 45 degrees. The coupling surfaces may be aligned substantially parallel to the longitudinal axis of the central portion of the top link member.

Each leg member may be secured to the top link member by at least one releasable fastener, the at least one fastener extending across the joint in a direction orthogonal to the plane of the coupling surfaces. Optionally, the at least one fastener may extend across the joint vertically and may be insertable in a downward direction. The at least one releasable fastener may be a screw fastener and may be a bolt. There may be more than one releasable fastener. In an embodiment, each leg member is secured to the top link member by four releasable fasteners.

The hitch may be configured such that each leg member is attachable to either side of the top link member. The arrangement may be such that the leg members are attachable to the top link member in a first configuration to define a first hitch width and in a second configuration to define a second hitch width different from the first hitch width. The leg members may each comprise an upper end for coupling to a respective end of the top link member and a lower end comprising a hitch hook, wherein the hitch hook is laterally offset relative to the upper end of the leg member. The hitch hook may be laterally offset relative to a lateral centerline of the upper end of the leg member. The distal ends of the side regions of the top link member may each have a first leg member mount and the upper end of each leg member may have a corresponding second leg member mount engageable with a respective one of the first leg member mounts when the leg member is coupled to the top link member. For at least one of the leg members, the hitch hook may have a vertical centerline which is offset laterally from a vertical centerline of the second leg member mount.

In an embodiment, each leg member has a hitch hook at its lower end and a latching member for releasably retaining an implement coupling member in the hitch hook, the latching member may be pivotably mounted to the leg member for movement between a latching position and a non-latching position, the hitch further comprising a release mechanism for moving the latching member between its latching and non-latching positions, the release mechanism including a rod extending between an actuator and the latching member through the top link member and the respective leg member. The rod may comprise two separable parts, a first part extending through the top link member between the actuator and one end of the top link member and a second part extending between the latching member and the upper end of the leg member, the first and second parts of the rods being releasably connected. Where the leg members are attachable to the top link member in different configurations to define differing hitch widths, at least one part of the rod may be rotatable to enable attachment to the other part of the rod in all configurations of the leg members. The second part of the rod may be cranked, having a distal end region for attachment with the latching member that is offset laterally relative to the releasable connection between the first and second parts. The arrangement may be such that the second part is attachable to the first part in either of two orientations, a first orientation in which the distal end is offset laterally outwardly of the releasable connection and a second orientation in which the distal end is offset laterally inwardly of the releasable connection. There may be a separate release mechanism for each side of the hitch. In this case, the actuator may be manually activated and may be mounted to an outer end region of the central portion of the top link. The actuator may comprise a lever pivotally mounted to the top-link member. The latching member may comprise a bell crank.

In some embodiments, a hitch for an agricultural vehicle has a frame comprising a top link member and a pair of downwardly depending leg members. The top link member has a central portion extending generally horizontally in a lateral direction and a pair of side regions which extend laterally outwardly and downwardly from the central portion. Each leg member is removably attached to a distal end of a respective one of the side regions by means of a plurality of releasable fasteners, which fasteners extend generally in a vertical direction.

In a hitch as described, the hitch may be configured such that the leg members are attachable to the top link member in a first configuration to define a first hitch width and in a second configuration to define a second hitch width different from the first hitch width. The leg members may each comprise an upper end for coupling to the top link member and a lower end comprising a hitch hook, wherein the hitch hook is laterally offset relative to the upper end of the leg member. For at least one of the leg members, the hitch hook may have a vertical centerline which is offset laterally from a vertical centerline of the upper end of the leg member where it is coupled to the top link member.

In an embodiment, each leg member has a hitch hook at its lower end, the hitch hook including a rearward projecting hook member and a latching member pivotally mounted to the leg member for movement between a latching position and a non-latching position. The quick hitch further comprises a release mechanism for moving the latching members between their latching and non-latching positions. The release mechanism for each latching member includes a respective rod extending between an actuator and the latching member through the top link member and the respective leg member. The rod may comprise two separable parts: a first part extending through the top link member between the actuator and one end of the top link member and a second part extending between the latching member and the upper end of the leg member, the first and second parts of the rods being releasably connected. Where the leg members are attachable to the top link member in different configurations to provide differing hitch widths, at least one part of the rod may be rotatable to enable attachment to the other part of the rod in all configurations of the leg members. The second part of the rod may be cranked, having a distal end region for attachment with the latching member that is offset laterally relative to the releasable connection between the first and second parts. The arrangement may be such that the second part is attachable to the first part in either of two orientations, a first orientation in which the distal end is offset laterally outwardly of the releasable connection and a second orientation in which the distal end is offset laterally inwardly of the releasable connection. There may be a separate release mechanism for each side of the hitch. In this case, the actuator may be manually activated and may be mounted to an outer end region of the central portion of the top link. The actuator may comprise a lever pivotally mounted to the top-link member. The latching member may comprise a bell crank.

The hitch may be mountable to a three-point linkage on the agricultural vehicle, which may be a tractor.

In a further embodiment, a hitch assembly comprises a top link member and a pair of leg members removably attachable to the top link member, wherein the top link member and the leg members are configured as described above when assembled.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Certain embodiments of the disclosure will now be described, by way of example only, with reference to the accompanying drawings, in which.

DETAILED DESCRIPTION

Figure 1:
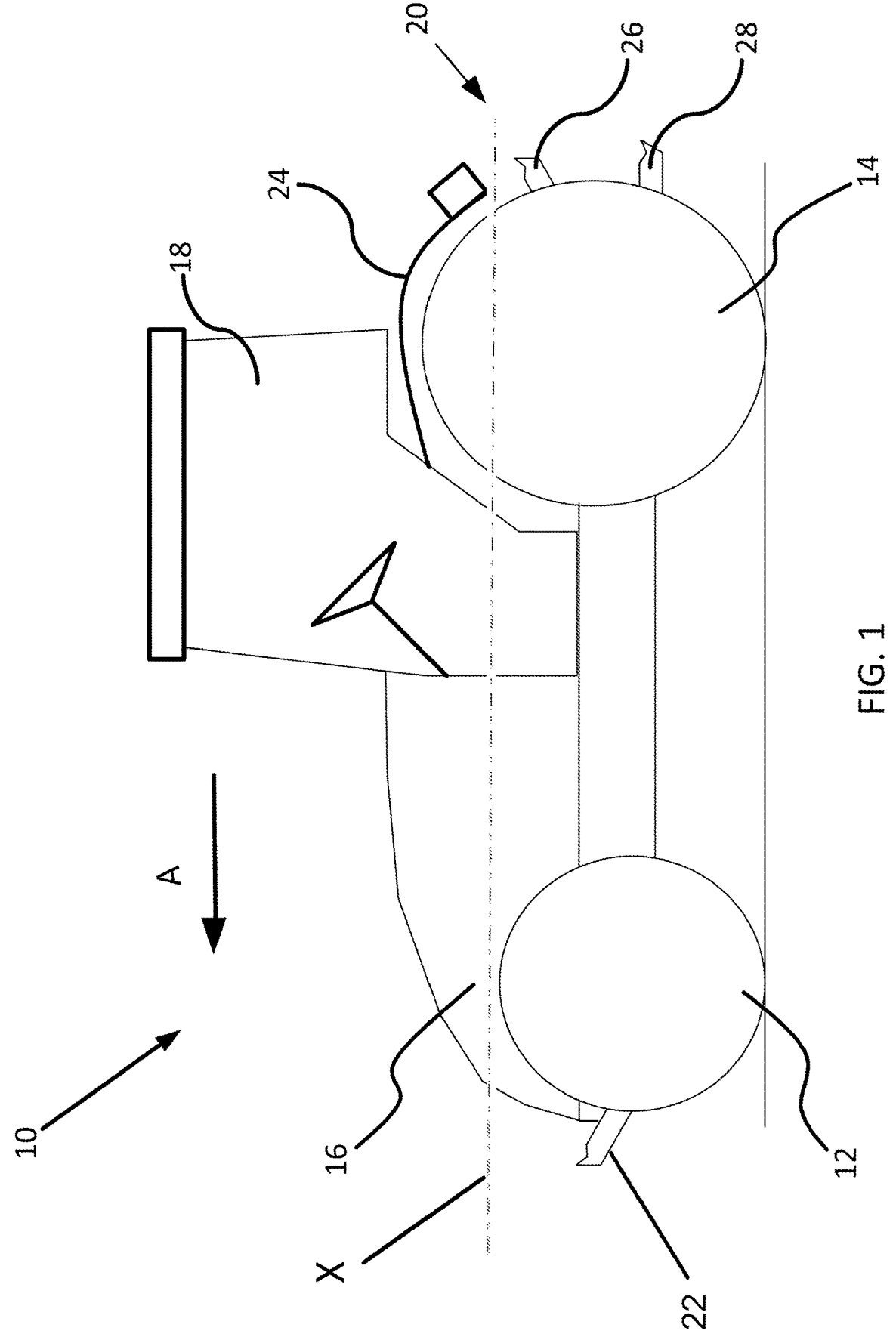
FIG. 1 is a somewhat schematic illustration of an agricultural tractor viewed from one side.

With reference to FIG. 1, an agricultural tractor is indicated at 10. The tractor 10 comprises front wheels 12, rear wheels 14, an engine section 16 and a cab section 18. A rear three-point linkage 20 is provided at the rear of the tractor 10, and a front linkage 22 (which may also be a three-point linkage) is provided at the front of the tractor 10. Rear fenders 24 are provided to cover a portion of the rear wheels 14. The tractor has a longitudinal axis X. A forward direction of travel of the tractor 10 parallel to the longitudinal axis X is indicated by arrow A.

The rear three-point linkage 20 includes an upper link arm 26 and a pair of lower link arms 28, which arms 26, 28 project from the body of the tractor 10 in a manner well known in the art. Only one lower link arm 28 can be seen in FIG. 1. However, a second lower link arm is parallel and spaced transversely to the one shown.

Figure 2:
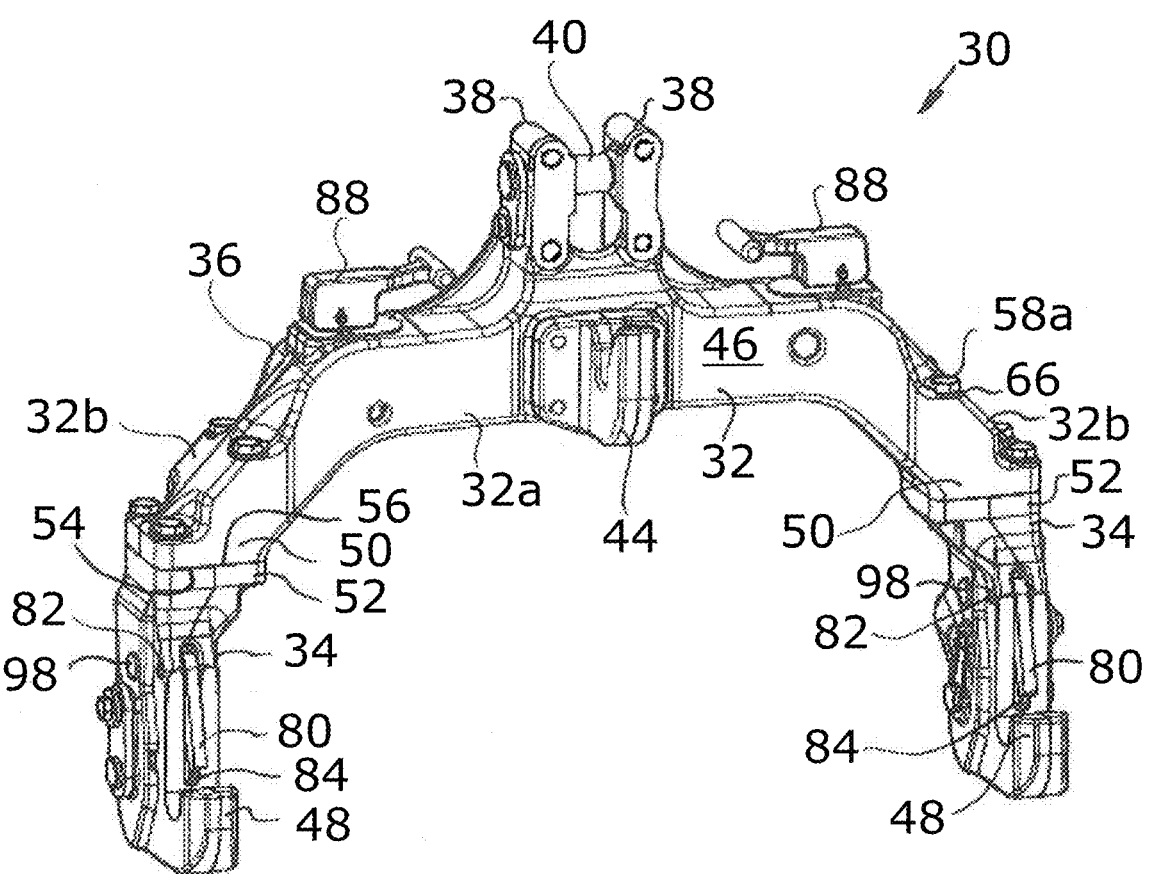
FIG. 2 is perspective view from the rear and to one side of a quick hitch that may be attached to a three-point hitch of a tractor such as that illustrated in FIG. 1.

With reference initially to FIG. 2, quick hitch 30 is mountable to the rear linkage 20 of the tractor.

The quick hitch 30 comprises a top link member 32 and a pair of separable leg members 34. The top link member 32 and the leg members 34 are coupled together to form a frame 36 of the quick hitch 30. The top link member 32 is provided with a pair of spaced brackets 38 defining laterally extending bores which receive a removable upper link arm pin 40 arranged to attach the upper link arm 26 of the rear linkage 20 to the frame 36. Towards their lower ends, each of the leg members 34 defines a recess (see FIGS. 5 and 6) which is open at a forwardly directed face. A lower linkage arm pin 42 is removably mounted laterally across the recess and is arranged to be coupled to respective one of the lower link arms 28 of the linkage 20. Mounting of a quick hitch 30 to a three-point linkage is well known in the art and so these features are not shown or described in any further detail.

Relative terms such as "forward," "front," "rearward," and "rear" used herein in relation to the quick hitch 30 or any of its component parts should be understood with reference the forward direction of movement A of a tractor 10 to which the quick hitch 30 is mounted in use, assuming the quick hitch is attached to a rear linkage 20 of the tractor. Thus, a forward face of the quick hitch frame 36 is a face which is directed towards the front of the tractor. Similarly, terms such as "lateral" or "laterally" should be understood as referring to a direction from side to side, perpendicular to the longitudinal axis X of a tractor 10 to which the quick hitch 30 is mounted in use. Furthermore, relative terms such as "top," "up," "upper," "upward," "uppermost," "bottom," "down," "downward," "lower," "lowermost," "horizontal," or "vertical" and the like used in relation to the quick hitch 30 or any of its component parts, should be understood as relating to the quick hitch 30 and its component parts when the quick hitch is oriented as shown in the accompanying drawings with the top link member uppermost and aligned horizontally (e.g., parallel to the ground) so that it would extend laterally relative to a longitudinal axis X of a tractor 10 when mounted to a three-point linkage of the tractor, notwithstanding that the quick hitch 30 can be used in other orientations.

An upper hitch hook 44 is centrally located on the top link member 32. The upper hitch hook 44 extends rearward from a rear face 46 of the top link member 32 to present an upper connection point to the quick hitch 30 for a tractor implement. Similarly, rearward directed lower hitch hooks 48 are provided on the lower, distal ends 34a of the leg members 34 to present opposed lower connection points for a tractor implement.

The top link member 32 has a laterally extending central portion 32a and opposed side regions 32b which extend laterally outwardly and downwardly from opposite ends of the central portion. The distal free end of each of the side regions 32b has first leg member mount 50, to which a respective one of the leg members 34 is mounted. Upper end regions of the leg members 34 have corresponding second leg member mounts 52 which engage with the first leg member mounts 50. The first and second leg member mounts 50, 52 are configured such that when a leg member 34 is mounted to the top link member 32, it extends downwardly below the respective first leg mount 50 to which it is attached. The first and second leg member mounts 50, 52 are also arranged so that the joint between each leg member 34 and the top link member 32 extends generally in a horizontal direction. In an embodiment, the first and second leg member mounts 50, 52 define corresponding coupling surfaces 54, 56 that abut one another when a first leg member mount 50 and a second leg member mount 52 are assembled. The coupling surfaces 54, 56 extend substantially in a horizontal plane (e.g., substantially in a plane aligned perpendicular to a longitudinal axis of the leg member and/or parallel to the longitudinal axis of the central portion 32a of the top link member). Each of the first and second leg member mounts 50, 52 has at least one coupling surface 54, 56 so that there are at least a pair of corresponding coupling surface 54, 56 at each joint between the top link member 32 and a respective leg member 34. In other embodiments, each of the first and second leg member mounts 50, 52 have more than one coupling surface but all the coupling surfaces extend in a common plane. In still further embodiments, each of the first and second leg member mounts 50, 52 is stepped, having at least two coupling surfaces aligned on different horizontal planes. In other embodiments, the corresponding coupling surfaces 54, 56 are not aligned substantially horizontally parallel to the longitudinal axis of the central portion 32a of the top link member but may be inclined relative to the axis by, for example, no more than 45 degrees, no more than 25 degrees, no more than 10 degrees, or no more than 5 degrees. It will be appreciated that the joint is still aligned generally horizontally where the corresponding coupling surfaces 54, 56 are only inclined relative to the horizontal by a small amount.

Each leg member 34 is secured to the top link member 32 by at least one releasable fastener 58, which in an embodiment is a screw fastener such as a bolt. In an embodiment, each leg member 34 is secured to the top link member 32 by four releasable fasteners 58, but there may be more or fewer than four fasteners such as one, two, three, five fasteners 58, or more. In an embodiment, the releasable fastener(s) are aligned vertically (i.e., a longitudinal axis of each fastener extends perpendicular to the plane or planes of the coupling surfaces). In an embodiment, the releasable fasteners 58 can be inserted and/or released from above. In an embodiment, each releasable fastener extends through a vertically oriented bore 60 in the first leg member mount 50 to engage in an aligned internally threaded bore 62 in the second leg member mount 52. In this embodiment, each releasable fastener 58 may have a head 58a which abuts an upwardly directed surface 64 of first leg member mount about the bore 60, the arrangement configured such that when the fasteners are fully tightened, the corresponding coupling surfaces 54, 56 are firmly clamped together. Washers 66 may be located between the head of each fastener 58 and the upwardly directed surface 64.

It will be appreciated that other fastening arrangements can be used to releasably couple the first and second leg member mounts 50, 52. For example, the bolts 58 or other screw-type fasteners may be insertable from below and/or at least some may not be aligned strictly vertically. Further, fasteners comprising bolts and nuts could be used or indeed any other suitable releasable fastener type or a mixture of different fastener types can be used.

Looked at another way, reference to the joints between the top link member 32 and the leg members being aligned generally vertically can be defined as requiring that the releasable fasteners 58 pull the respective leg member 34 and the top link member together in a generally vertical direction to clamp the coupling surfaces together, even where the coupling surfaces 54, 56 are not aligned horizontally.

Figures 3, 4:
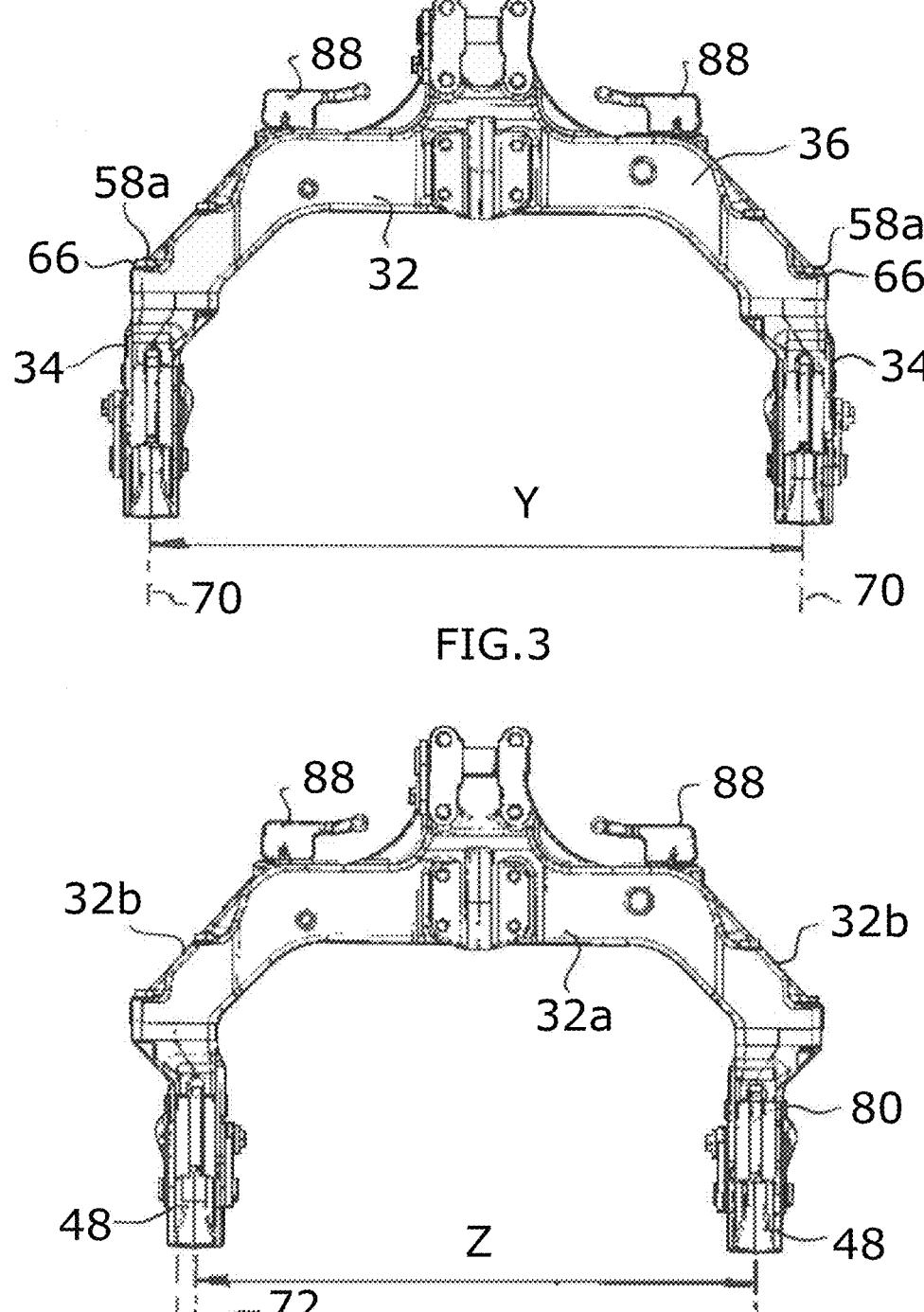
FIG. 3 is a plan view from the rear of the quick hitch of FIG. 2 in a first configuration.
FIG. 4 is a plan view from the rear of the quick hitch of FIG. 2 in a second configuration.

The leg members 34 and the first and second leg member mounts 50, 52 are arranged so that the leg members 34 can be mounted to either side of the top-link member in at least a first and a second configuration, in which the lateral spacing (i.e., the width) between the lower hitch hooks 48 is different in each configuration. This can be seen by comparing FIGS. 3 and 4, in which FIG. 3 shows the leg members 34 mounted in a first configuration to provide a first lateral spacing Y between the lower hitch hooks 48 and FIG. 4 shows a second configuration which provides a second lateral spacing Z smaller (narrower) than the first spacing Y.

In one embodiment, a vertical centerline 70 of the lower hitch hook 48 on each leg member 34 is offset laterally by a distance 72 from a vertical centerline of the second leg member mount 52. When the leg members 34 are mounted to the top link member 32 in the first configuration as shown in FIG. 3, the vertical centerline 70 of each lower hitch hook 48 is offset laterally outside the vertical centerline 74 of the respective second leg member mount 52 to provide a wide spacing between the lower hitch hooks 48. When the leg members 34 are mounted to the top link member 32 in the second configuration as shown in FIG. 4, the vertical centerline 70 of each of the lower hitch hooks 48 is offset laterally inside the vertical centerline 74 of the respective second leg member mount 52 to provide a narrow spacing between the lower hooks 48. In this regard, the vertical centerlines 70, 74 are imaginary lines drawn vertically though the center of the lower hitch hooks 48 and second leg member mounts 52 respectively as considered in a lateral direction, that is to say at a mid-point from one side to the other. The leg members 34 can be changed between the first and second configurations by simply switching them from one side of the top link member 32 to the other without otherwise altering their orientation relative to the top-link member.

In an embodiment, each of the leg members has a latching member 80 for securely retaining a connector of a tractor implement engaged in the lower hitch hook 48. Each latching member 80 is mounted by means of a pivot 82 to the respective leg member 34 and is movable about the pivot 82 between latching and non-latching positions. In the latching position, as shown in FIG. 2, a lower end of the latching member 80 projects at least part-way across the upper opening of its respective lower hitch hook 48 to prevent a connector of a tractor implement engaged in the lower hitch hook 48 from being disengaged. In the non-latching position, the latching member 80 is at least partially retracted into a recess 84 in the leg member 44 such that a connector of an implement can be moved into or out of engagement with the lower hitch hook 48.

Each latching member 80 is moved between its latching and non-latching positions by a release mechanism, indicated generally at 86. Each latching member 80 may be in the form of a bell crank, and each release mechanism 86 may include an actuator in the form of a lever 88 mounted to the top link member 32. The lever 88 may be operatively connected to the respective latching member 80 by a rod 90 such that movement of the lever 88 from a first position as shown to a second position in which the lever is raised, moves the latching member 80 from its latching position to its non-latching position. The release mechanism 86 preferably includes a resilient arrangement to bias the lever 88 to its first position and hence also biasing the latching member

80 to its latching position. In the arrangement shown in FIGS. 5 and 6, a coil spring 92 is mounted in compression between a spring abutment surface 94 on the rod 90 and an inner surface of the top link member to bias the rod 90 downwardly, drawing the lever 88 to its first position and the latching member 80 to its latching position. The latching member 80 may be configured so that a connector for an implement can be engaged in the lower hitch hook 48 without having to move the release mechanism lever 88 by pressing the connector into the hook 48, causing the latching member 80 to move to its non-latching position against the bias force of the spring 92. When the implement connector is engaged in the hitch hook 48 below the latching member 80, the latching member is biased to its latching position by the spring 92. To remove the implement connector, it is necessary to use the lever 88 to retract the latching member 80 to its non-latching position. This arrangement enables easy attachment of an implement to the quick hitch 30 but prevents an implement from being disengaged inadvertently.

Figure 5:
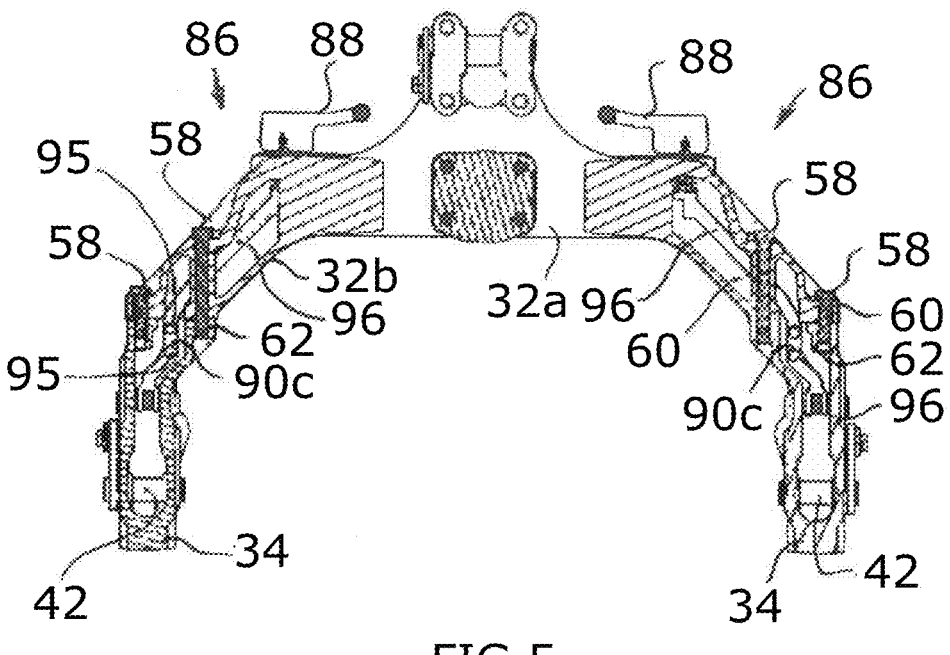
FIG. 5 is a plan view similar to that of FIG. 3 but with part the frame of the quick hitch shown cutaway to reveal details of a release mechanism for moving a latching member of a lower hitch hook located inside the frame, the release mechanism configured for use with the quick hitch in the first configuration.
Figure 6:
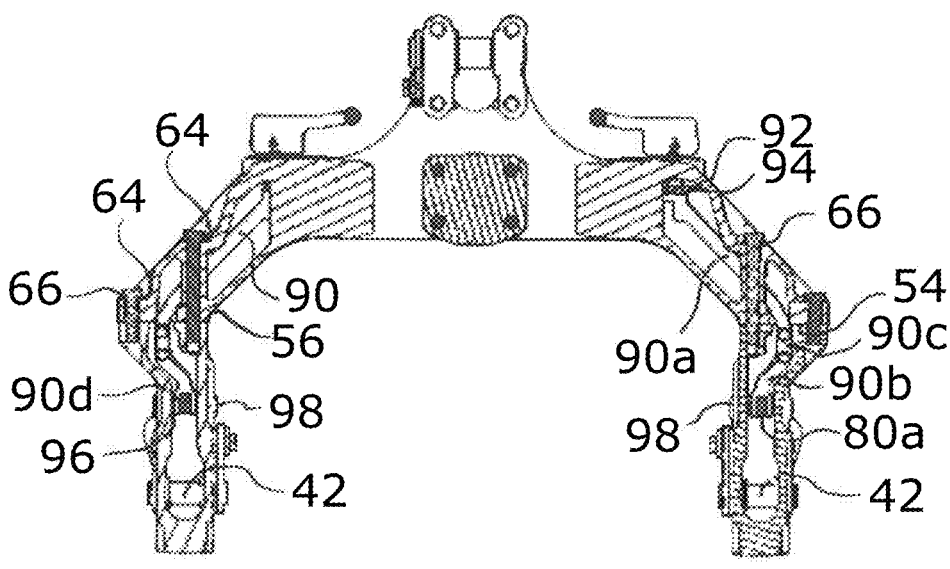
FIG. 6 is a plan view similar to that of FIG. 4 but with part the frame of the quick hitch shown cutaway to reveal details of a release mechanism for moving a latching member of a lower hitch hook located inside the frame, the release mechanism configured for use with the quick hitch in the second configuration.

The release mechanism levers 88 are mounted to an upper surface of the top link member 32 close to the outer ends of the central portion 32a where they are easily accessible. Each rod 90 extends internally through a side portion 32b of the top link member 32 and the respective leg member 34 from the lever 88 to the latching member 80. With reference to FIGS. 5 and 6, to allow for separation and removal of the leg members 32, each rod 90 comprises two parts, a first part 90a extending from the lever 88 to the distal end of the side portion 32b of the top link member at the first leg member mount 50 and a second part 90b extending from the latching member 80 to the upper end of the leg member at the second leg member mount 52. The two parts of the rod 90 are releasably connected at a joint 90c, which may include overlapping portions of the first and second parts 90a, 90b releasably secured together by one or more releasable fasteners 95, such as bolts. The free, distal end 90d of the second part 90b of the rod is pivotally connected to the latching member 80 by a clevis pin type of connection. The free end 90d of the second part 90b of the rod defines a pair of forks which locate either side of part 80a of the latching member 80. Aligned orifices in the forks and the latching member receive a clevis pin or bolt 96 to attach the latching member 80 to the rod 90b. Access to the clevis pin or bolt 96 is provided through aligned orifices in side wall regions of the leg member which are closed removable plugs 98. The two parts of the rod 90a, 90b are shaped to facilitate connection together whether the leg members 34 are assembled in either of the first or second configurations. The second part 90b of the rod is cranked and is attachable to the first part 90a in a first orientation as shown in FIG. 5 in which the free end 90d is cranked to the outside for use when the quick hitch is in the first configuration. When the quick hitch is in the second configuration, the second part can be reattached to the upper part in a second orientation in which it is rotated through 180 degrees so that the free end 90d is cranked to the inside.

To separate a leg member 34 from the top link member 32, the plugs 98 are removed and the bolt or clevis pin 96 removed to disconnect the latching member 80 from the rod 90. The bolts 58 securing the leg member 34 are then disconnected and the leg member can be separated from the top link member 32 downwardly, leaving the second part 90b of the rod 90 in position attached to the first part 90a of the rod. To attach a leg member 34 to the top link member 32, the above process is reversed. If the leg members 34 are being switched from one side to the other to alter the width between the lower hitch hooks 48, the second parts 90b of the rods are separated from the first parts 90*a* rotated through 180 and reattached, after the leg members 34 have been separated from the top link member and prior to their being reattached.

Other arrangements for releasably connecting the rod 90 to the latching member 80 or for releasably connecting the first and second parts 90*a* and 90*b* of the rod can be used.

In alternative arrangements, a release mechanism enabling both latching members 80 to be operated by a single actuator can be adopted. Furthermore, whether the latching members 80 are both operated through the same actuator, or each operated by a dedicated actuator, the actuator or actuators may be automatically actuatable and may be fluid powered or electronic, for example.

Though the ability to reconfigure the quick hitch 30 by swapping the leg members 34 from side to side to vary the spacing between the lower hitch hooks 48 can be advantageous, in other embodiments it may only be possible to attach each lower leg member 34 to a given side of the top link member 32 or swapping the leg members from one side to the other may not vary the lateral spacing between the lower hitch hooks 48. In such embodiments, a vertical centerline 70 of the lower hitch hook 48 on each leg member 34 may not be offset laterally from a vertical centerline of the second leg member mount 52. Such arrangements will enable the lower leg members 34 to be replaced or removed for repair but without providing a variable width quick hitch. Where the width of the quick hitch 30 is not adjustable, the latching member actuating rods 90 could be provided in one piece.

Mounting the leg members 34 to extend vertically down below the distal end regions of the laterally and downwardly extending side regions 32*b* of the top link member 32 provides increased clearance between the quick hitch 30 and parts of a tractor 10 to which it is mounted, such as the rear fenders 28. Positioning the actuator levers 88 for the latching members 80 of the lower hitch hooks 48 on the central portion 32*a* of the top link member also allows for greater clearance. The use of horizontally aligned joints between the top link member 32 and the leg members 34 not only provides for increased strength of the assembled frame 36 but enables the bolts 58 used to secure the leg members to the top link member to be inserted vertically and from above. This provides for easy removal or assembly of the leg members 34 while the quick hitch 30 is mounted to a tractor.

All references cited herein are incorporated herein in their entireties. If there is a conflict between definitions herein and in an incorporated reference, the definition herein shall control.

What is claimed is:

1. A hitch for an agricultural vehicle, the hitch comprising:

a frame having an elongate top link member, the top link member having a central portion extending generally horizontally in a lateral direction and a pair of side regions which each extend laterally outwardly and downwardly from the central portion; and a pair of leg members removably attached to the top link member, each leg member being removably attached to a distal end of a respective one of the side regions of the top link member at a joint aligned along a generally horizontal plane.

2. The hitch of claim 1, wherein each joint is aligned generally parallel to a longitudinal axis of the central portion of the top link member.

3. The hitch of claim 1, wherein each joint comprises at least one pair of corresponding coupling surfaces, wherein the at least one pair of coupling surfaces includes a first coupling surface on the distal end of the side region of the top link member and a second coupling surface on an upper end of the leg member, wherein the corresponding coupling surfaces abut one another and are inclined relative to a longitudinal axis of the central portion of the top link member by an angle of no more than 45 degrees.

4. The hitch of claim 3, wherein the coupling surfaces are aligned substantially parallel to the longitudinal axis of the central portion of the top link member.

5. The hitch of claim 3, wherein each leg member is secured to the top link member by at least one releasable fastener, the at least one releasable fastener extending across the joint in a direction orthogonal to the plane of the coupling surfaces.

6. The hitch of claim 1, wherein the hitch is configured such that each leg member is attachable to the distal end of either of the side regions of the top link member, such that the leg members are attachable to the top link member in a first configuration to define a first hitch width and in a second configuration to define a second hitch width different from the first hitch width.

7. The hitch of claim 6, wherein each leg member comprises an upper end for coupling to the distal end of a respective one of the side regions of the top link member and a lower end comprising a hitch hook, wherein the hitch hook is laterally offset relative to the upper end of the leg member.

8. The hitch of claim 6, wherein the distal end of each of the side regions of the top link member defines a first leg member mount and an upper end of each leg member defines a corresponding second leg member mount engageable with a respective one of the first leg member mounts when the leg member is coupled to the top link member, each leg member having a hitch hook at its lower end, wherein the hitch hook has a vertical centerline which is offset laterally from a vertical centerline of the second leg member mount.

9. The hitch of claim 1, wherein each leg member has a hitch hook at a lower end and a latch configured to releasably retain an implement coupling member in the hitch hook, the latch being pivotably mounted to the leg member for movement between a latching position and a non-latching position relative to the hitch hook, the hitch further comprising a release mechanism for moving the latches between their latching and non-latching positions, the release mechanism including at least one actuator on the top link member and, for each latch, a respective rod extending between the at least one actuator and the latch through the top link member and the respective leg member.

10. The hitch of claim 9, wherein each rod comprises two parts, a first part extending through the top link member between the at least one actuator and a distal end of a side region of the top link member and a second part extending between the respective latching member and the upper end of the respective leg member, the first and second parts of the rods being releasably connected.

11. The hitch of claim 10, wherein the hitch is configured such that each leg member is attachable to the distal end of either of the side regions of the top link member, such that the leg members are attachable to the top link member in a first configuration to define a first hitch width and in a second configuration to define a second hitch width different from the first hitch width and wherein the second part of the rod is configured to be attachable to the first part in either one of a first orientation to enable attachment to the latching member when the hitch is in the first configuration and a second orientation to enable attachment to the latching member when the hitch is in the second configuration.

* * * * *